(12) United States Patent
Grimanis et al.

(10) Patent No.: US 7,708,285 B2
(45) Date of Patent: May 4, 2010

(54) ELASTOMER SPRING MECHANICAL SEAL

(75) Inventors: Michael P. Grimanis, Wayland, MA (US); Joseph K. Kaleshian, Burlington, MA (US)

(73) Assignee: A.W. Chesterton Company, Woburn, MA (US)

( * ) Notice: Subject to any disclaimer, the term of this patent is extended or adjusted under 35 U.S.C. 154(b) by 0 days.

(21) Appl. No.: 11/255,322

(22) Filed: Oct. 21, 2005

(65) Prior Publication Data

US 2007/0090605 A1    Apr. 26, 2007

(51) Int. Cl.
    *F16J 15/36* (2006.01)
(52) U.S. Cl. .................. 277/379; 277/380; 277/389; 277/392
(58) Field of Classification Search .......... 277/379, 277/380, 389, 391–393
    See application file for complete search history.

(56) References Cited

U.S. PATENT DOCUMENTS

| | | | | |
|---|---|---|---|---|
| 2,360,372 A | * | 10/1944 | Snyder | 277/392 |
| 2,671,407 A | * | 3/1954 | Higbie | 415/174.3 |
| RE238,898 | * | 11/1954 | Haake | 277/393 |
| 2,939,730 A | * | 6/1960 | Geoffrey | 277/370 |
| 4,838,560 A | * | 6/1989 | Heilala | 277/371 |
| 5,332,235 A | * | 7/1994 | Fone et al. | 277/380 |
| 6,220,601 B1 | * | 4/2001 | Keller et al. | 277/381 |
| 6,918,593 B2 | * | 7/2005 | Takahashi | 277/389 |
| 2002/0047240 A1 | * | 4/2002 | Radosav | 277/389 |

FOREIGN PATENT DOCUMENTS

WO    96/10708    4/1996

OTHER PUBLICATIONS

Chilean Search Report for Application No. 2854-06, dated Oct. 20, 2006.

* cited by examiner

*Primary Examiner*—Alison K Pickard
(74) *Attorney, Agent, or Firm*—Lahive & Cockfield, LLP; Anthony A. Laurentano, Esq.

(57) ABSTRACT

A mechanical composite seal assembly for providing a seal between a rotating shaft and a static surface. The mechanical composite seal assembly includes first and second axially adjacent annular seal elements. The first and second seal elements each include a sealing edge contacting the shaft to provide a respective seal between the first and second seal element and the shaft. A static housing receives the first and second seal elements and engages the static surface to provide a static stationary seal, while concomitantly providing a flex region that engages the seal elements to form a dynamic seal therewith.

11 Claims, 8 Drawing Sheets

ELASTOMER SPRING MECHANICAL SEAL

FIELD OF THE INVENTION

The present invention relates to a seal assembly for sealing a shaft or a rod relative to a stationary housing component. In particular, the invention relates to a composite seal assembly for providing a seal between a shaft immersed in a liquid and a stationary housing, such as any prime mover such as a submersible pump or rotary equipment requiring sealing a fluid such as a gear box.

BACKGROUND OF THE INVENTION

Conventional mechanical seal assemblies are employed in a wide variety of environments and settings, such as for example, in mechanical apparatuses, to provide a fluid-tight seal. The sealing assemblies are usually positioned about a rotating shaft or rod that is mounted in and protrudes from a stationary mechanical housing.

A conventional sealing assembly generally comprises a sealing element formed of a metallic spring or metallic springs in parallel for biasing the sealing face elements. The biasing element biases the sealing face elements into sealing engagement with the shaft to form a fluid-tight seal.

Figure 1:
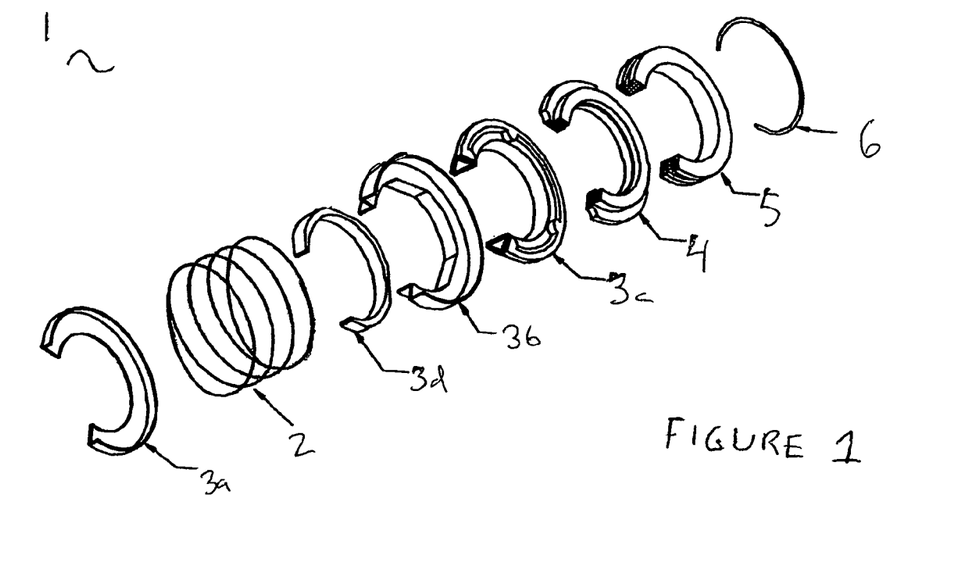
FIG. 1 illustrates a submersible mechanical seal of the prior art.

FIG. 1 illustrates an example of a mechanical seal in the prior art. As shown, the illustrative prior mechanical seal 1 requires one or more springs 2 for applying a loading force to a seal face, formed by mating a rotating seal face 4 and a stationary seal face 5, and multiple housing components 3a-d. The multiple housing components include a spring holder 3a, a rotating seal face retainer 3b, a rotating elastomer bellows 3c and a drive band 3d. The prior art seal 1 further includes an O-ring 6 for the stationary seal face 5.

However, such sealing assemblies suffer from a number of deficiencies and disadvantages. Disadvantages of prior seals, such as the one shown in FIG. 1, include non-uniform seal-face loading, exposure of the spring to process fluid and clogging of debris in the spring. For example, the spring is typically exposed to the internal or process fluid of the mechanical apparatus being sealed, which can potentially degrade the spring, potentially leading to the failure of spring. In addition, springs and other movable biasing elements tend to lose their resilient biasing characteristics over time, impairing the efficiency of the seal.

Other and more specific objects of this invention will in part be obvious and in part be evident from the drawings and description which follow.

SUMMARY OF THE INVENTION

The present invention provides an improved mechanical seal assembly for sealing a component, such as a pump or any rotating equipment. The mechanical seal assembly of the present invention employs a unitary housing piece to provide an enhanced loading on seal faces and prevent clogging of the seal. The housing piece mounts a rotary seal element in a cooperating groove. A stationary seal element interfaces with the rotary seal element to provide a seal. The housing piece may include a bellows region for transmitting axial and radial pressures of the submersible component to the sealing faces. A clamp may be provided to clamp the housing piece to a shaft.

According to a first aspect of the invention, a mechanical seal assembly for providing a seal around a shaft is provided. The mechanical seal assembly comprises a seal holder for receiving and applying a loading force to a seal element and a first annular seal element mounted in the seal holder. The seal holder comprises a substantially annular sleeve including an annular front face and a radially-extending annular groove spaced from the front face for seating a portion of a seal element. The first annular seal element comprises an annular ring having a substantially L-shaped cross-section. A first portion of the first annular seal element is configured to be received in the radially-extending annular groove and a second portion of the first annular seal element extends past the front face of the holder.

According to another aspect of the invention, a holder for a seal element in a mechanical seal assembly is provided, which comprises a substantially cylindrical-shaped sleeve having a front section, a middle section and a rear section. The front section is configured to mount a rotary seal element, and comprises an annular ring having a substantially L-shaped groove formed in a front face thereof. The rear section comprises an annular ring. The middle section connects the front section and the rear section and comprises a curved wall extending between the front section and the rear section. The curved wall curves in a radial direction and an axial direction to translate system pressure to an axial force and a radial force on a rotary seal element mounted in the holder.

According to still another aspect of the invention, a method of assembling a mechanical seal assembly is provided. The method comprises the steps of providing a seal holder comprising a substantially cylindrical-shaped sleeve having a front section defining an annular front face and a radially-extending annular groove spaced from the front face, a middle section and a rear section, providing a rotary seal ring including an annular protrusion configured to be received in the radially-extending annular groove and mounting the rotary seal ring in the holder by inserting the annular protrusion in the radially-extending annular groove so that a portion of the rotary seal ring extends past the annular front face.

According to still another aspect of the invention, mechanical seal, comprises a holder having a front section forming a groove, an intermediate section forming a bellows region for translating pressure, and a rear section and a seal element configured for mounting within the groove. The seal element is adapted to seat within the groove in an interference fit to form a seal region, thereby being free of a secondary sealing element in the seal region.

According to another aspect of the invention, a mechanical seal, comprises a first sealing element having a seal face, a second sealing element having a seal face and a seal holder formed of a single unitary component having a resilient intermediate section for translating pressures applied thereto to a sealing force to bias the seal faces together.

BRIEF DESCRIPTION OF THE DRAWINGS

These and other features and advantages of the present invention will be more fully understood by reference to the following detailed description in conjunction with the attached drawings in which like reference numerals refer to like elements through the different views. The drawings illustrate principals of the invention and, although not to scale, show relative dimensions.

DETAILED DESCRIPTION OF THE PREFERRED EMBODIMENTS

The present invention provides a composite seal assembly for providing sealing on a rotating shaft or other suitable device. The invention will be described below relative to illustrated embodiments. Those skilled in the art will appreciate that the present invention may be implemented in a number of different applications and embodiments and is not specifically limited in its application to the particular embodiment depicted herein.

The terms "seal assembly" and "sealing assembly" as used herein are intended to include various types of sealing assemblies, including single seals, split seals, concentric seals, spiral seals, and other known seal and sealing assembly types and configurations.

The term "shaft" is intended to refer to any suitable device in a mechanical system to which a seal can be mounted and includes shafts, rods and other known devices.

The terms "axial" and "axially" used herein refer to a direction generally parallel to the axis of a shaft. The terms "radial" and "radially" used herein refer to a direction generally perpendicular to the axis of a shaft. The terms "fluid" and "fluids" refer to liquids, gases, and combinations thereof.

The term "axially inner" as used herein refers to the portion of stationary equipment and a seal assembly proximate the mechanical system employing the seal assembly. Conversely, the term "axially outer" as used herein refers to the portion of stationary equipment and a seal assembly distal from the mechanical system.

The term "radially inner" as used herein refers to the portion of the seal assembly proximate a shaft. Conversely, the term "radially outer" as used herein refers to the portion of the seal assembly distal from a shaft.

The terms "stationary equipment", "static surface" and "gland" as used herein are intended to include any suitable stationary structure housing a shaft or rod to which a seal is secured.

Figure 2A:
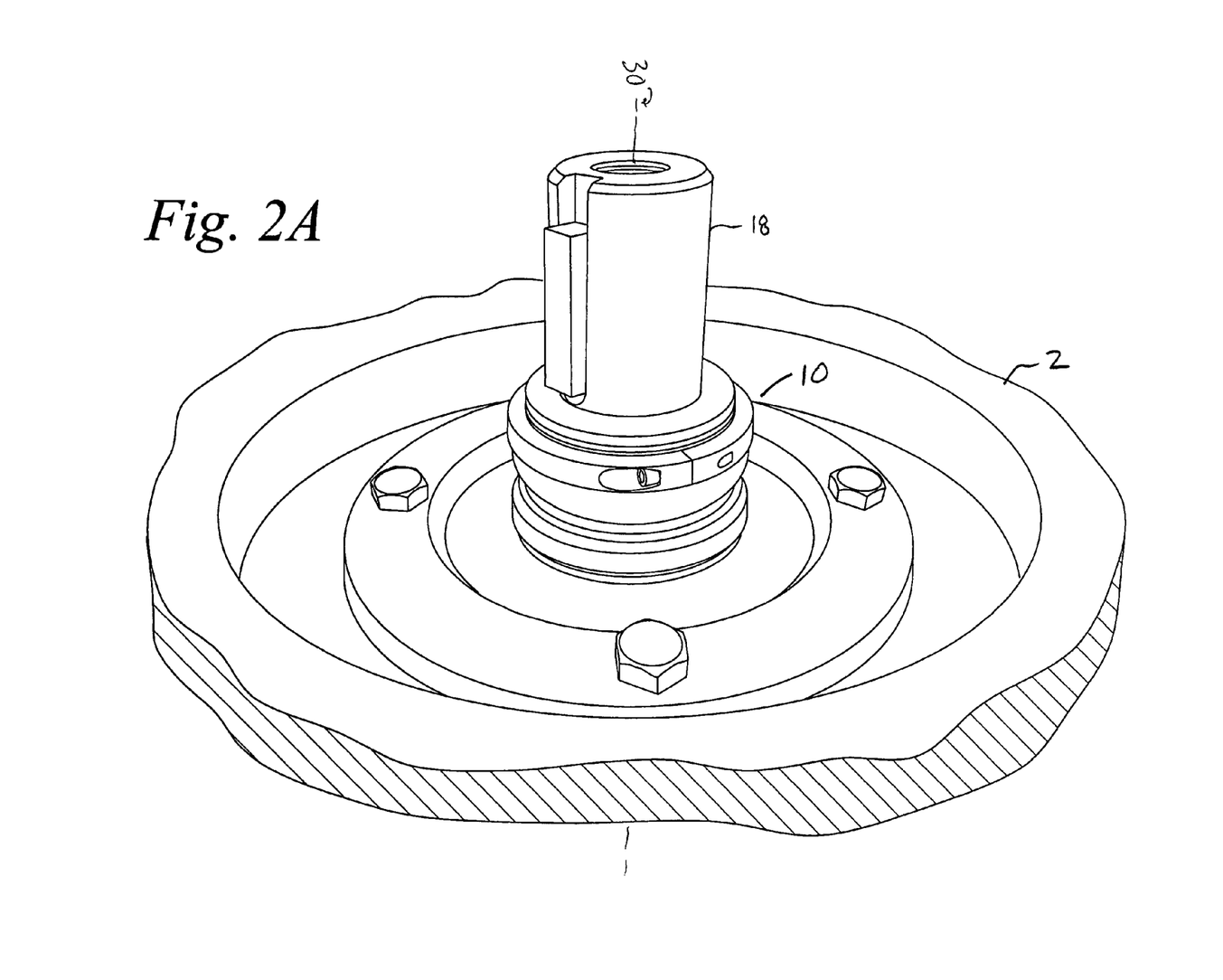
FIGS. 2A-2C illustrate a mechanical seal of an illustrative embodiment of the invention mounted to a submersible system.

An exemplary embodiment of a seal assembly 10 in accordance with the teachings of the present invention is illustrated in FIGS. 2A-11. As shown in FIGS. 2A-2C, the seal assembly 10 is preferably concentrically disposed about a rotating shaft 18 or a rod extending from a system 2, which may be a submersible pump used in applications such as sewage and wastewater, as shown in FIGS. 2A-2C. While the seal assembly 10 and corresponding system 2 are submersible and suitable for use in sewage and wastewater applications or other submerged environments, one skilled in the art will recognize that the seal assembly may be used to provide a seal in any suitable environment. The shaft 18 extends along an axis 30, and is partially mounted within the housing of the system 2. During operation of the mechanical system 2 that employs the illustrated seal assembly 10, the shaft 18 rotates within or reciprocates along the axis 30 relative to the stationary portion of the equipment.

Referring to FIGS. 3-11, the seal assembly 10 includes a plurality of sealing components 20, 12 and 14, configured to cooperate with each other to provide fluid sealing and a leak-proof path between the stationary equipment 2 and the shaft 18, thereby preventing fluid from leaking from the mechanical system.

Figure 2B:
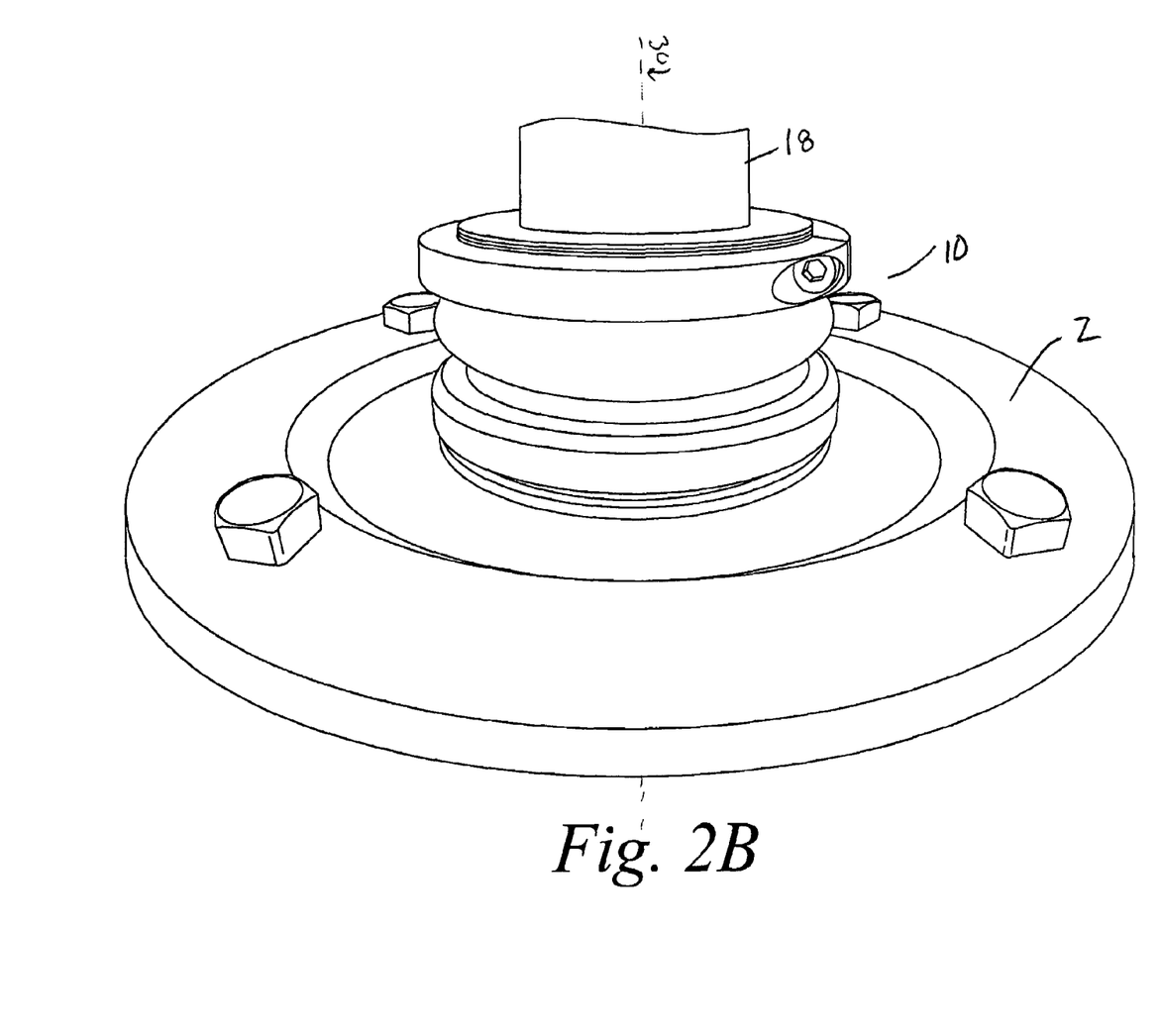
Figure 2C:
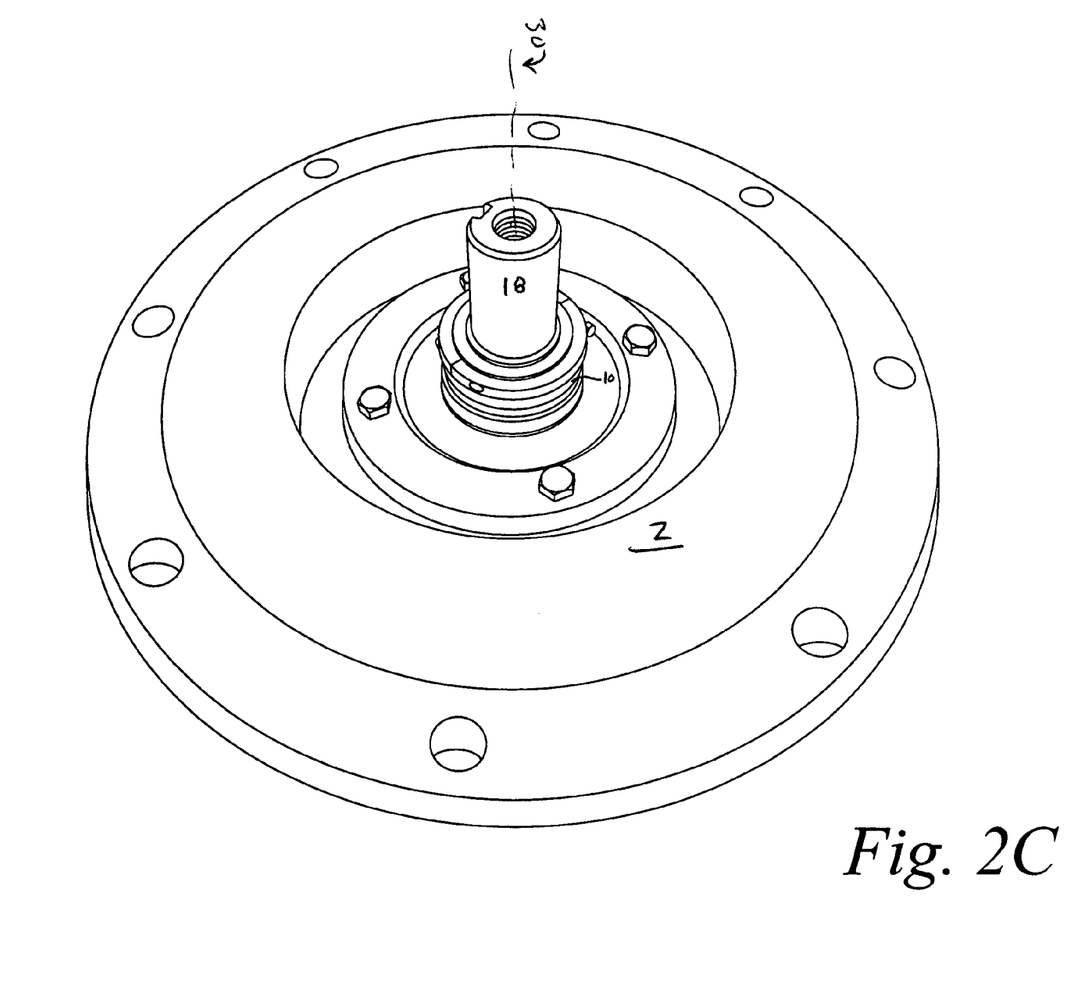
Figure 3:
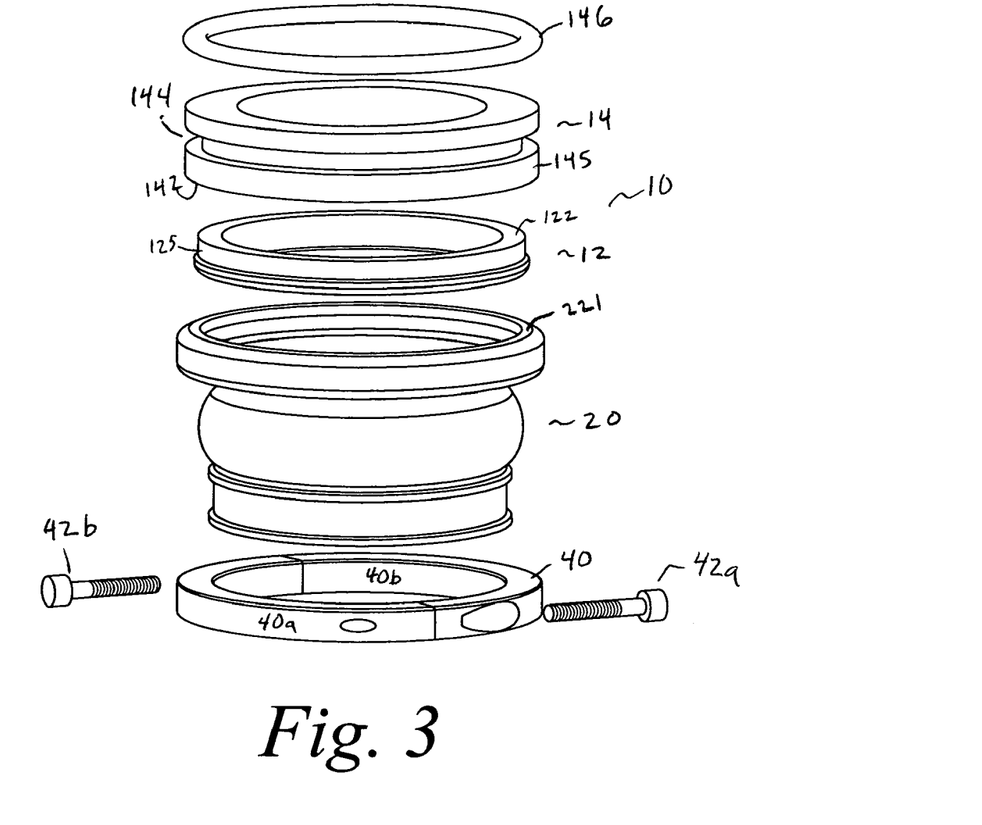
FIG. 3 is an exploded view of a mechanical seal of an illustrative embodiment of the invention.

As shown in FIGS. 3-9, the seal assembly 10 includes a seal holder 20, a first annular seal element 12 mounted in the seal holder 20 and a second annular seal element 14 axially adjacent to the first annular seal element 12 for providing dynamic sealing against the shaft 18 of the system shown in FIGS. 2A-2C. The second annular seal element 14 is disposed within or adjacent to the system 2, and the first annular seal element 12 and holder 20 extend from the system, as shown in FIGS. 2A-2C. The first annular seal element 12 defines a rotary seal face 122 configured to mate with a stationary seal face 142 of the second annular seal element 14 to provide a fluid-tight interface between the seal elements. According to the illustrative embodiment, the first annular seal element is snap-fitted into the seal holder 20, or is held therein by an interference fit to form a seal region, which eliminates the need for a separate secondary sealing element, such as an O-ring to ensure sealing between the holder 20 and the first annular seal ring 12. A clamp 40 may be provided on an axially outer end the seal holder 20 for clamping the seal assembly to the shaft 18. An O-ring 146 may be disposed about an outer surface of the second annular seal element 14 to provide sealing between the second annular seal element and the stationary system 2. Details of the various seal components are provided below.

According to a preferred embodiment, the seal components are formed of thermoset and thermoplastic materials, though one skilled in the art will recognize that any suitable materials that are fluid compatible may be used. The illustrative seal holder 20 is formed of a polymer elastomer material, such as polyurethane, which provides optimum loading and enhanced abrasion resistance. The rotary seal ring 12 and the stationary seal ring 14 are formed from suitable wear materials that possess the appropriate tribological characteristics, though one skilled in the art will recognize that any suitable material or materials may be used to form the seal components. Typical seal face materials include, but are not limited to carbon, tungsten carbide, duplex carbide, silicon carbon, alumina oxide, hardened metals, PTFE based substances and mixtures thereof.

The seal holder 20 provides a unitary seal housing that reduces clogging and allows for two-dimensional translation of system pressure to the seal faces 122, 142 in both an axial and a radial direction to facilitate sealing. The use of a unitary housing eliminates the need for additional seal components, as well as facilitates installation, assembly and manufacture of the seal 10.

When assembled, the seal components of the seal assembly 10 cooperate to provide sealing between the seal elements and the shaft 18, between the seal elements and the other seal components, and sealing between the seal assembly and the mechanical system 2 of FIGS. 2A-2C. The seal components of the seal assembly 10 are preferably held together through an interference fit, though one skilled in the art will recognize that any suitable means for assembling, fitting, securing and retaining the seal components or seal assembly components may be used.

The seal holder 20, illustrated in detail in FIGS. 6-10, is specifically configured to facilitate sealing, load balancing and alignment of the seal components. The illustrative seal holder 20 comprises a substantially cylindrical sleeve 21 forming three separate, yet integrally formed sections: a front section 22 for mounting the first annular seal element 12, a rear section 24 for receiving the clamp 40, and a middle section 26 extending between and connecting the front section 22 and the rear section 24. The middle section 26 preferably forms a bellows region to facilitate translation of system pressure to the seal faces 122, 142 during operation.

As shown, the front section 22 of the seal holder 20 comprises a substantially annular, hooked ring configured to receive a portion of the first annular seal element 12. The front section 22 preferably facilitates a snap-fit or interference connection with the first annular seal element 12, which eliminates the need for a separate O-ring or other sealing component about the first annular seal element. The front section 22 defines a front face 221 and a radially extending groove 223 axially spaced from the front face 221 for receiving an annular protrusion of the first annular seal element 12. The front section 22 is preferably formed by a first radially extending wall 222 defining the front face 221 and separated from a second radially extending wall 224 by the groove 223. An axially extending wall 226 connects the radially outer ends of the first and second radially extending walls to define the groove 223.

The second radially extending wall 224 is longer than the first radially extending wall 222. The first radially extending wall 222 has a radially inner end that is farther from the longitudinal axis of the seal than the radially inner end of the second radially extending wall, in order to accommodate the first annular seal element. As shown, the second radially extending wall 224 extends from an inner diameter $Di_1$ defined by an axially extending, substantially flat surface 232 that intersects the middle section 26 of the seal holder 20, to an outer diameter $Do_1$ aligned with an outer surface of the axially extending wall 226. The second radially extending wall 224 has a thickness $T_1$ of between about 4 mm and about 10 mm and preferably about 5 mm, though one skilled in the art will recognize that the wall 224 may have any suitable thickness. The second radially extending wall 224 also defines a curved, concave outer surface 236 at the intersection of the wall 224 with the middle section 26 of the seal holder 20. The curvature of the intersecting surface 236 is between about 1.5 mm and about 3.5 mm and preferably about 2.5 mm, relative to a ninety degree angle, though one skilled in the art will recognize that the intersection between the middle section 26 and the front section 22 may have any suitable configuration, including walls intersecting at right angles.

Figure 4:
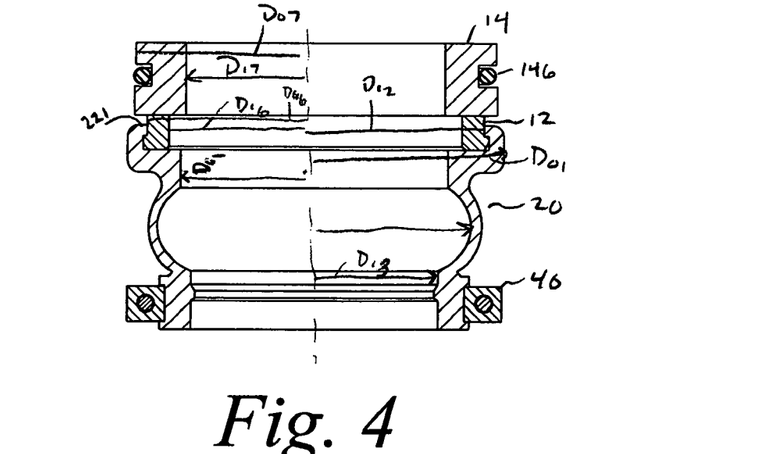
FIG. 4 is a cross-sectional view of an assembled mechanical seal.

The first radially extending wall 222 extends from an inner diameter $Di_2$ that is larger than the inner diameter $Di_1$ of the second radially extending wall 224 to the same outer diameter $Do_1$. An axially extending surface 227 at the inner diameter $Di_2$ is configured to interface with an outer surface of the first annular seal element 12, as shown in FIG. 4. The groove 223 thus forms one leg of a substantially L-shaped groove 223b in the front section 22 of the seal holder 20, with the second leg formed between the surface 227 and the shaft 18. The illustrative first radially extending wall 222 has a thickness $T_2$ of about 4 mm, that is smaller than the thickness $T_1$ of the second radially extending wall 224, though one skilled in the art will recognize that the walls may have any suitable size and thickness.

The axially extending wall 226 has a thickness $T_3$ of about defining the groove 223 has a radially inner diameter $Di_y$ that is between the inner diameter $Di_2$ of the first radially extending wall and the outer diameter $Do_1$ of the first and second radially extending walls 222 and 224.

Figure 5:
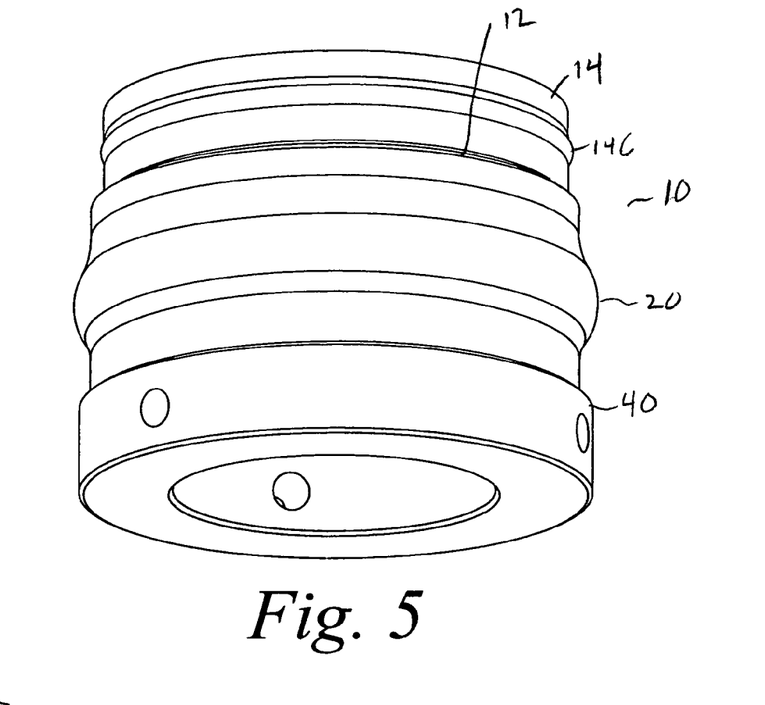
FIG. 5 is a perspective view of the assembled mechanical seal of FIG. 4.
Figure 6:
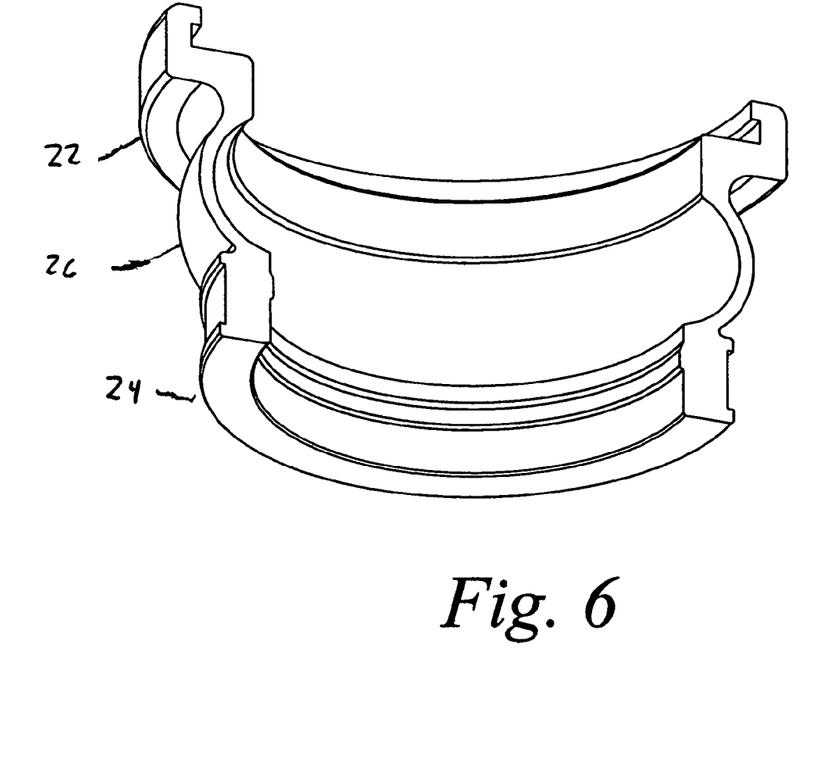
FIG. 6 is a cutaway cross-sectional view of the seal holder of the mechanical seal of the illustrative embodiment of the invention.
Figure 7:
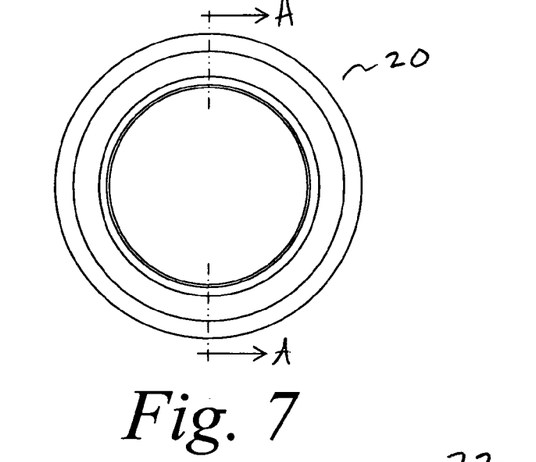
FIG. 7 is a front view of the seal holder of FIG. 6.
Figure 8:
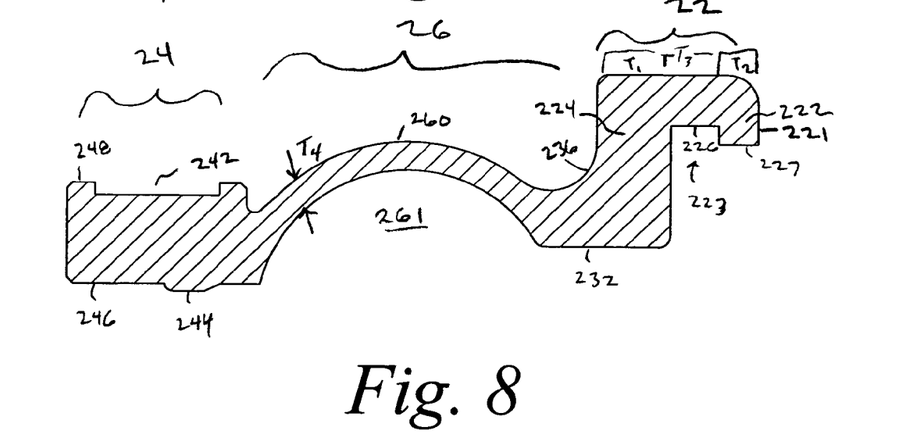
FIG. 8 is a cross-sectional view of the seal holder along axis A-A of FIG. 7.

The front section 22 is thus configured to mount the first seal element by interference fit, such that a portion of the first annular seal element extends past the front face 221 of the seal holder, as shown in FIGS. 4 and 5.

The middle or intermediate section 26 of the seal holder 20 forms a bellows region for translating system pressure to the seal faces 122, 142 to bias the seals faces together. This section is resilient and has a certain degree of flexibility. The middle section preferably comprises a curved wall 260 that extends from the second axially extending wall 224 of the front section 22 to the rear section 24 of the holder. The curved wall 260 preferably curves in both an axial and a radial direction to define a shape that is substantially the radially outer-half of a torus-shaped object (i.e., a doughnut). The curved wall 260 thus defines an annular space 261 surrounding the shaft 18 in the middle region of the seal holder 20. As shown, the axially forward part of the curved wall 260, nearest the front section 22, has a larger inner diameter, equal to the inner diameter $Di_1$, than the inner diameter $Di_3$ of the axially rearward portion of the curved wall 260, which matches the inner diameter of the rear section. Preferably, the curved wall 260 has a substantially constant thickness $T_4$, which is thinner than the walls of front and rear sections.

Figure 9:
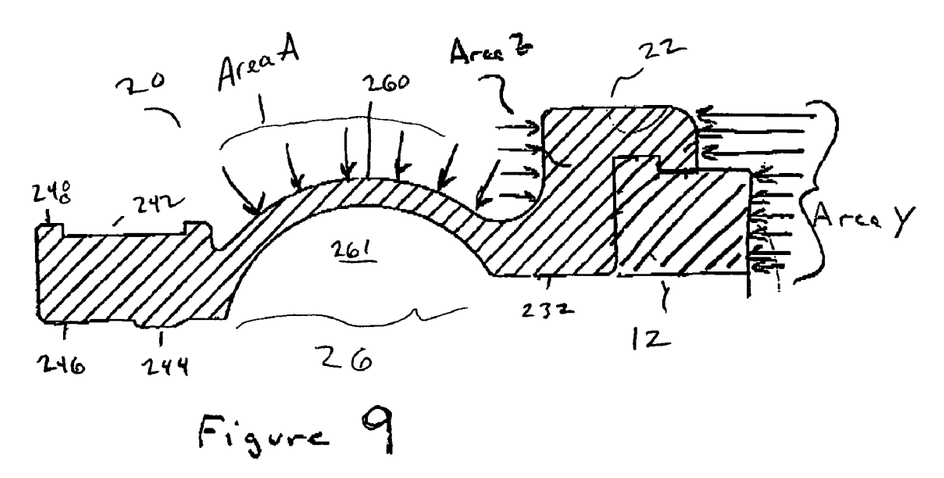
FIG. 9 is a cross-sectional view of the seal holder and rotary seal ring during application of fluid pressure according to the illustrative embodiment of the invention.

The bellows region formed by the middle section 26 of the seal holder 20 translates system pressure in both an axial and radial direction to the seal faces 122, 142. The bellows region formed by the middle section 26 provides a load to the annular seal element 12 in a pre-compressed posture in the equipment at zero (0 psig) pressure conditions. Fluid pressure acting over area Z, as shown in FIG. 9, applies additional sealing force between the interface of annular seal elements 12 and 14. The outer surface 260 also provides a surface area A over which the system pressure superimposes a force between the sealing interface at 12 and 14. However, as the system pressure increases, only a portion of the force is applied to the faces. The percentage of force that is realized is controlled by areas Y and Z shown in FIG. 9. The system pressure acts on area Z, however, only a part of the force created is realized at the interface. A part of the force is negated by the same system pressure acting in an equal but opposite manner along area Y. The curved bellows 26 thus allows for pressure to act in both an axial and radial direction along the curved bellows surface 260 over area A, which enhances sealing.

The rear section 24 of the seal holder 20 has a substantially rectangular cross-section and is configured to mount the seal holder 20 to the shaft 18. The radially outer surface 248 of the rear section preferably defines a recess 242 for mounting a clamp 40 to clamp the seal holder 20 to the shaft 18. An interior protrusion 244 projects from a radially inner surface 246 of the rear section 24 for sealing against the shaft 18. In the illustrative embodiment, the radially inner surface 246 of the rear section 24 has a smaller inner diameter $Di_3$ than the radially inner surface of the front section, defined by the wall 232, to facilitate a tight seal against the shaft 18.

Figure 10:
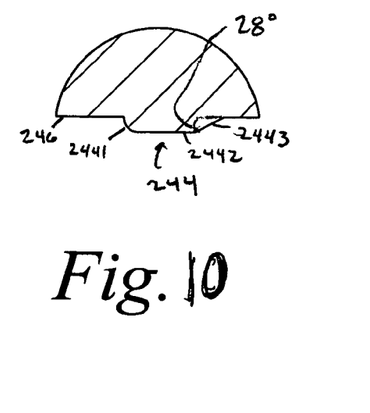
FIG. 10 is a detailed view of the protrusion on the inner surface of the rear section of a seal holder according to an illustrative embodiment of the invention.

FIG. 10 is a detailed view of the protrusion 244 on the radially inner surface of the rear section of the seal holder 20 according to an illustrative embodiment of the invention. The illustrative protrusion 244 includes an axially rearward rounded edge 2441, an axially extending flat surface 2442 extending parallel to the inner surface 246 from the edge 2441 and an angled surface 2443 extending between the flat surface 2442 and the inner surface 246. In the illustrative embodiment, the angled surface 2443 extends at an angle of about twenty-eight degrees from the inner surface 246, though one skilled in the art will recognize that the angled surface 2443 may extend at any suitable angle. According to the illustrative embodiment, the axially forward edge of the protrusion 244, where the angled surface 2443 intersects the inner surface 246, aligns with the axially forward end of the recess 242. One skilled in the art will recognize that the protrusion 244 may have any suitable size and shape for contacting and sealing against a shaft.

The illustrative seal 10 thus provides an integrated, unitized seal housing 20 for retaining a seal ring, mounting the seal ring to a shaft, aligning the seal components, and using system pressure to load seal faces and bias the seal faces together.

Figure 11:
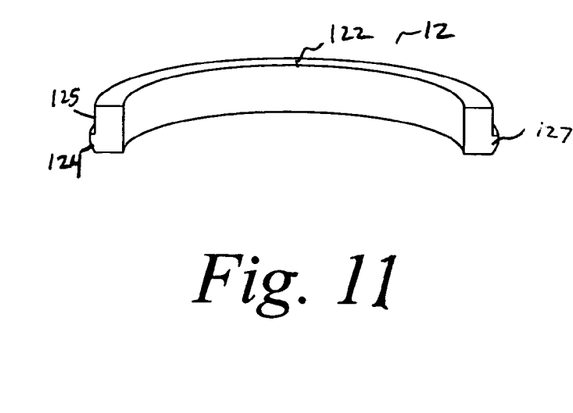
FIG. 11 is a cutaway cross-sectional view of a rotary seal ring of the mechanical seal of the illustrative embodiment of the invention.

Referring to FIG. 11, the first annular seal element 12 mounted in the seal holder 20 preferably comprises a rotary seal ring having a substantially L-shaped cross-section. The axially rearward portion of the rotary seal ring 12 forms an annular protrusion 127 forming one leg of the L-shaped cross-section that is sized and configured to be received in the groove 223 of the seal holder 20. The first annular seal element 12 has a thickness extending from an inner diameter $D_{i6}$ to an outer diameter $D_{o6}$, such that when the seal assembly is assembled, the inner diameter $D_{i6}$ is larger than the inner diameters of the seal holder and the corresponding stationary seal ring 14, as shown in FIG. 4. The outer diameter $D_{o6}$ matches the inner diameter of the first radially extending wall 222 in the front section of the seal holder, such that when assembled, the outer surface 125 of the seal element 12 abuts the axially extending surface 227 of the front wall of the seal holder 20.

According to the illustrative embodiment, the annular protrusion 127 of the first annular seal element 12 has a slanted top surface 124 that slants downwards in an axially outward direction. This angled surface provides a leading edge to facilitate installation of the first seal element into the seal holder 20.

The illustrative stationary seal ring 14 is preferably larger in length and thickness than the rotary seal ring 12. The stationary seal ring extends from an inner diameter $D_{i7}$ that substantially matches the inner diameter of the inner surface 246 of the rear section of the holder 20, to an outer diameter $D_{o7}$. The outer surface 145 includes an outer groove 144 for receiving an O-ring 146 for sealing against a component of the system 2 being sealed.

The clamp 40 may comprise any suitable means for securing the seal holder 20 to a shaft. In the illustrative embodiment, the clamp 40 comprises two arcuate components 40a, 40b configured to form a ring when assembled. Head screws 42a, 42b are provided for compressing the clamp around the rear section 24 and locking the clamp in place, thereby locking the seal holder to a shaft 18.

One skilled in the art will recognize that the seal elements 12, 14 may have any suitable size and configuration for establishing one or more dynamic fluid seals with the shaft 18.

The illustrative mechanical seal provides significant advantages over prior mechanical seals in the prior art. The seal employs unitized housing components, which facilitate manufacture, assembly and operation. In particular, the seal provides loading forces without requiring springs, which can be subject to clogging and degradation. The cost of supplying mechanical seals with this configuration is substantially less than mechanical seals that would be deficient of some of these advantages.

While the exemplary embodiment of the composite seal assembly 10 of the present invention is described above in connection with pump systems, one skilled in the art will recognize that the composite seal assembly 10 can be used in many different environments and applications.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

The invention claimed is:

1. A holder for a seal element in a mechanical seal assembly, comprising:
    a substantially cylindrical-shaped unitary sleeve having a front section, a middle section and a rear section,
    wherein the front section is configured to mount a rotary seal element, the front section comprising an annular ring having a substantially annular groove forming a front face thereof with an L-shaped cross-section for receiving an annular ring of a seal element, the front section further comprising a radially extending wall;
    the rear section comprising an annular ring including a recess formed on an outer surface for receiving a clamp for securing the holder to a shaft and an annular ridge on an inner surface for contacting a shaft extending through the holder; and
    the middle section connecting the front section and the rear section and comprising a curved wall having substantially the shape of a radially outer half of a torus extending in a radially outward direction from a first inner diameter wherein the curved wall intersects the front section to a outer diameter and to second inner diameter where the curved wall intersects the rear section, wherein the curved wall curves in a radial direction and an axial direction to translate system pressure to an axial force and a radial force on a rotary seal element mounted in the holder, wherein the first inner diameter is larger than the second inner diameter and the front section has an outer diameter that is larger than the outer diameter of the middle section,
    wherein the radially extending wall defines a curved, concave outer surface of the holder at an intersection of the radially extending wall with the middle section of the seal holder, a curvature of the curved, concave outer surface being between about 1.5 mm relative to a ninety-degree angle and 3.5 mm relative to a ninety-degree angle.

2. The holder of claim 1, wherein the curved wall of the middle section has a substantially constant thickness.

3. The holder of claim 1, wherein the front section has a radially extending annular wall having a first side defining a front face of the seal holder and a second side defining an axially forward sidewall of the annular groove having an L-shaped cross-section.

4. The holder of claim 1, wherein the radially extending wall is a first radially extending wall and the front section further comprises a second radially extending wall, the second radially extending wall axially forward of the first radially extending wall, and an axially extending wall connecting a radially outer end of the first radially extending wall to a radially outer end of the second radially extending wall.

5. The holder of claim 4, wherein the first radially extending wall defines a flat, axially extending inner surface and an intersection point where the first radially extending wall intersects the curved wall of the middle section.

6. The holder of claim 4, wherein the second radially extending wall extends from the axially extending wall to an inner diameter that is larger than an inner diameter of the first radially extending wall.

7. The holder of claim 4, wherein the second radially extending wall has a first thickness that is smaller than a second thickness of the first radially extending wall.

8. The holder of claim 1, wherein a radially extending portion of the L-shaped groove of the front section is sized and configured to receive an annular protrusion on a seal ring.

9. The holder of claim 1, wherein the holder is configured to apply a loading force without requiring springs.

10. The holder of claim 1, wherein the curvature of the curved, concave outer surface is about 2.5 mm relative to a ninety-degree angle.

11. A holder for a seal element in a mechanical seal assembly, comprising:
  a substantially cylindrical-shaped sleeve having a front section, a middle section and a rear section,
  the front section configured to mount a rotary seal element by an interference fit and comprising a radially extending wall;
  the rear section comprising an annular ring including a recess formed on an outer surface for receiving a clamp for securing the holder to a shaft and an inner surface for contacting a shaft extending through the holder;
  the middle section connecting the front section and the rear section and comprising a curved wall having substantially the shape of a radially outer half of a torus extending in a radially outward direction from a first inner diameter wherein the curved wall intersects the front section to a outer diameter and to second inner diameter where the curved wall intersects the rear section, wherein the curved wall curves in a radial direction and an axial direction to translate system pressure to an axial force and a radial force on a rotary seal element mounted in the holder, wherein the first inner diameter is larger than the second inner diameter and the front section has an outer diameter that is larger than the outer diameter of the middle section; and
  wherein the radially extending wall defines a curved, concave outer surface of the holder at an intersection of the radially extending wall with the middle section of the seal holder, a curvature of the curved, concave outer surface being between about 1.5 mm relative to a ninety-degree angle and 3.5 mm relative to a ninety-degree angle.

* * * * *